H. E. MOUSE.
DIRIGIBLE HEADLIGHT.
APPLICATION FILED JAN. 10, 1920.
1,349,085. Patented Aug. 10, 1920.
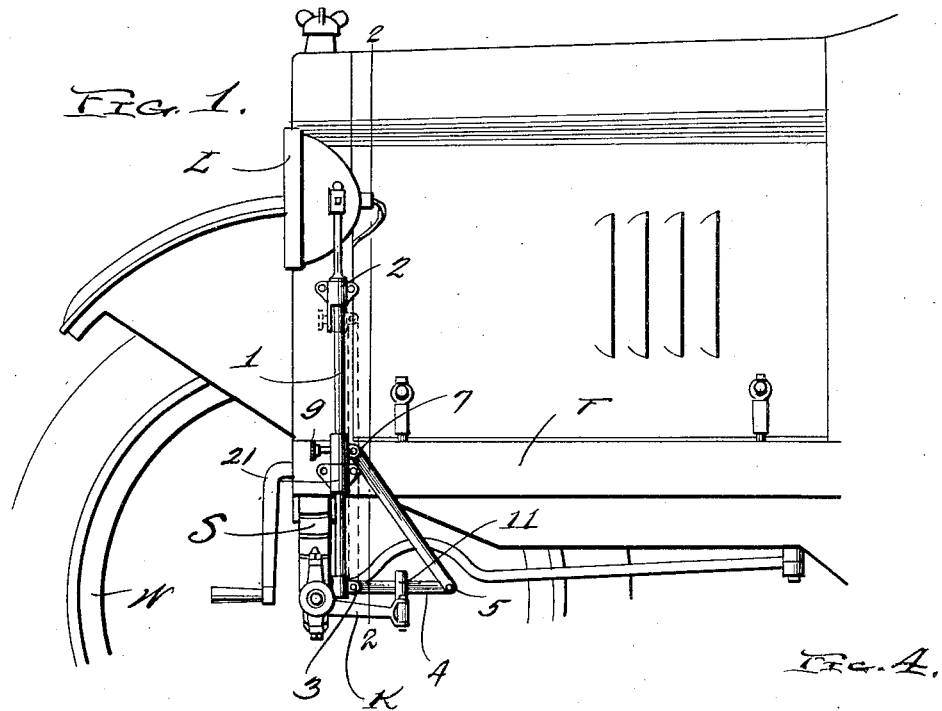
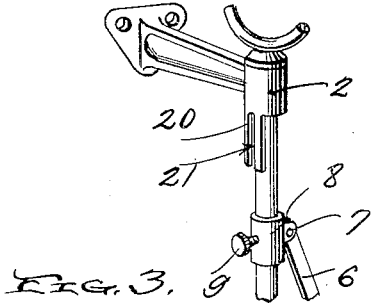
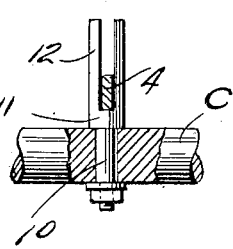
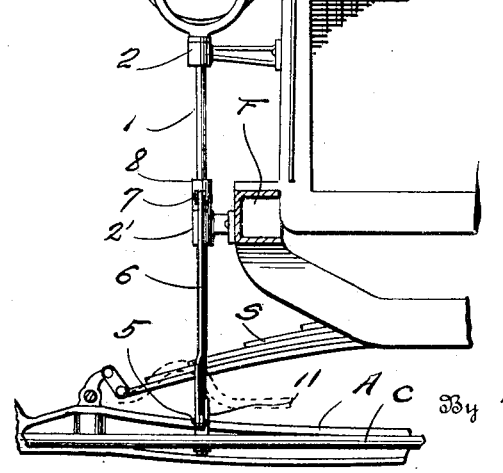
Inventor
Harold E. Mouse
Attorney

UNITED STATES PATENT OFFICE.

HAROLD E. MOUSE, OF ELKINS, WEST VIRGINIA.

DIRIGIBLE HEADLIGHT.

1,349,085.  Specification of Letters Patent.  Patented Aug. 10, 1920.

Application filed January 10, 1920. Serial No. 350,606.

*To all whom it may concern:*

Be it known that I, HAROLD E. MOUSE, a citizen of the United States, residing at Elkins, in the county of Randolph, State of West Virginia, have invented certain new and useful Improvements in Dirigible Headlights; and I do hereby declare the following to be a full, clear, and exact description of the invention, such as will enable others skilled in the art to which it appertains to make and use the same.

This invention relates to headlights for automobiles, and more especially to those which are dirigible and are turned automatically with and by the turning of the front wheels; and the object of the same is to produce a structure of this kind which may be attached to machines of the usual make and will support a headlight of any pattern.

The primary feature of the invention is the provision of means whereby the dirigibility of the headlight may be nullified at any time desired, by interrupting the connection between the lamp supporting post and the connecting bar between the knuckles.

A second and likewise important feature of the invention is the provision of means whereby the connection of each lamp with the steering rod may be interrupted independently of the connection of the other lamp, leaving one of them dirigible automatically and the other capable of being set by hand to project its rays in any desired direction.

The invention also has means for taking care of the relative movements between the body and the running gear, permitted by the springs, and the structure is such that this movement does not interrupt the connection referred to nor the dirigibility of the lamps.

One successful embodiment of the invention is set forth in the following specification and shown in the drawings wherein:

Figure 1 is a side elevation of the forward portion of an auto with the near wheel removed, the parts being set in full lines to connect the lamp post with the steering rod and shown in dotted lines as disconnected.

Fig. 2 is a vertical section on the line 2—2 of Fig. 1 looking forward, illustrating only a single lamp and its connection but showing it as turned forward.

Fig. 3 is an enlarged vertical section through the fork and its pivot in the connecting bar, and through the blade and link.

Fig. 4 is a perspective view of a slight amplification.

The invention is shown as applied to a well-known type of automobile wherein the bar C which connects the knuckles K of the front wheels W lies in rear of the front axle A, and springs S on the latter support the frame F which carries the body of the machine; but it will be understood that, by a slight change in the details of construction, the invention could be applied to a machine wherein the connecting bar stood forward of the axle. In any event the connecting bar is moved one way or the other to turn the front wheels to the right or left, and the mechanism for moving it forms no part of this invention and need not be illustrated. No novelty is claimed for the parts thus far referred to.

Coming now to the details of the structure other than than of the lamp L itself, the numeral 1 designates a post to whose upper end said lamp or headlight is attached in any suitable manner, and 2, 2' are bearings in which this post is mounted for operation so that it will stand upright alongside the body of the machine at an appropriate point. Pivoted at 3 to the post near the lower end of the latter is a rather thin bar or blade 4 projecting in the present case to the rear, and pivoted at 5 to the rear end of this blade is a link 6 which leads thence upward and is pivoted at 7 to a collar 8 slidably mounted on the post and held adjusted thereon by means of a set screw 9. By depressing this collar and fastening it by means of its set screw, the blade may be caused to stand out horizontally to the rear from the post; and by raising the collar and fastening it by means of its set screw, the link will lift the rear end of the blade so that the latter stands nearly vertical and alongside the post and the same may then be set as desired within its bearings to cause the lamp to throw its rays forward or laterally or obliquely in any direction as the operator may wish. In other words, when the blade is raised it is lifted from between the arms of a fork which is mounted on the rod or bar extending between the steering knuckles. This permits the lamp to be connected or disconnected at will, and therefore to be dirigible or not at the wish of the operator.

Swivelly mounted as at 10 to the connecting bar C is the stem of a fork 11 supported in an upright position by its mounting on such connecting bar, and between the arms 12 of this fork said blade is adapted to be disposed in the manner above described. Therefore when the connecting bar is moved transversely by the steering mechanism, the fork travels with it and swings the blade from side to side, with the result that the post is oscillated within its bearings. It will be clear that the blade may slide longitudinally between the fork-arms, and the swivel mounting of the fork in the connecting bar permits this movement. Also it will be clear that the blade may rise and fall between the fork-arms as required by the rise and fall of the entire body and the lamp post and blade, due to the compression of the spring S. In order that the blade may not become accidentally disconnected from the fork, the latter is made sufficiently long to allow for considerable movement of the parts on the spring and sufficiently wide between its arms so that the blade shall not be cramped therein.

When this structure is made and sold as an attachment, the forks can be swiveled in the connecting rods or bars C by boring upright holes through them at proper points, the bearings can be attached to the body and the posts mounted in them, the usual lamps L attached to the upper ends of the posts, and then the structure is ready for operation. If the connecting bar or rod C stands forward of the axle A, the bearings will need to be attached to the body in such a way that the blade projects forward instead of rearward from the posts as herein shown, and otherwise no change is necessary.

In Fig. 4 is shown a slight amplification to which the invention is susceptible, the same consisting in merely elongating the upper bearing 2 by means of a depending fork 20, although the same effect will be produced by forming an upright slot 21 in the bearing itself, such as exists between the arms of the fork. The purpose is to permit the collar 8 when raised to run up under the fork, or in any event to permit the shank of the set screw 9 to rise into the slot 21. Then when the set screw is tightened as above described, it has the additional function of holding the collar and therefore the post and lamp against rotation with respect to the bearing, so that the lamp is set with its rays directed straight forward.

What is claimed as new is:

1. In a headlight structure for autos, the combination with a bearing on the body, a lamp carrying post rotatably mounted in said bearing, and movable elements connected with the post for rendering it dirigible; of a collar slidable on the post beneath said bearing, means for locking the collar to the post and engaging it with said bearing when the collar is raised, and connections between the collar and one of said elements for interrupting the dirigibility of the structure when the collar is raised.

2. In a dirigible headlight for autos, the combination with an upright fork whose stem is adapted to be swiveled in the rod connecting the steering knuckles, and a lamp carrying post adapted to be mounted for operation in bearings on the auto body; of a blade pivoted to the lower end of the post and adapted to be dropped into position between the arms of said fork, a link pivoted to the free end of said blade, a collar slidably mounted on the post and to which the link is also pivoted, and a set screw for holding the collar in adjusted positions, for the purpose set forth.

3. In a dirigible headlight for autos, the combination with an upright fork whose stem is adapted to be swiveled in the rod connecting the steering knuckles, and a lamp carrying post adapted to be mounted for operation in bearings on the auto body; of a blade movably supported by said post and adapted to be dropped into position between the arms of said fork, the blade projecting then radially from the post, means for raising it out of such position, and means adjustably mounted on the post for holding the blade raised when desired.

4. In a dirigible headlight for autos, the combination with an upright fork whose stem is adapted to be swiveled in the rod connecting the steering knuckles, and a lamp carrying post adapted to be mounted for operation in bearings on the auto body; of a blade movably mounted at one end on the post and projecting radially therefrom and adapted to pass between the arms of the fork, a collar adjustably mounted on said post above the blade, and connections between the collar and blade for raising the latter out of engagement with said fork, at will.

5. In a headlight structure for autos, the combination with a bearing on the body provided with a pendant extension having an upright slot, a lamp carrying post rotatably mounted in said bearing, and movable elements connected with the post for rendering it dirigible; of a collar slidable on the post beneath said bearing, a set screw through the collar and adapted to be passed into said slot when the collar is raised, and connections between the collar and one of said elements for interrupting the dirigibility of the structure when the collar is set in raised position.

6. In a headlight structure, the combination with bearings on the body, one of them having an upright slot, a lamp carrying post mounted in said bearings, a blade pivotally connected with the lower end of the post, and means on the connecting rod of the steering mechanism for swinging said blade when it stands horizontal; of a collar slidably mounted on said post, a set screw through the collar adapted to pass into said slot when raised and to be set for holding the collar in raised or depressed position, and connections between it and said blade.

In testimony whereof, I affix my signature, in the presence of two witnesses.

HAROLD E. MOUSE.

Witnesses:
 FRED EVERETT,
 A. B. MOUSE.